US008774793B2

(12) United States Patent
Fishel

(10) Patent No.: US 8,774,793 B2
(45) Date of Patent: Jul. 8, 2014

(54) SYSTEMS AND METHODS OF PROVIDING INTELLIGENT HANDSET TESTING

(75) Inventor: Oleg Fishel, San Diego, CA (US)

(73) Assignee: Jot Automation, Ltd., Dallas, TX (US)

( * ) Notice: Subject to any disclaimer, the term of this patent is extended or adjusted under 35 U.S.C. 154(b) by 1384 days.

(21) Appl. No.: 12/157,752

(22) Filed: Jun. 13, 2008

(65) Prior Publication Data

US 2009/0312009 A1 Dec. 17, 2009

(51) Int. Cl.
*H04W 24/00* (2009.01)

(52) U.S. Cl.
USPC ........ 455/425; 455/423; 455/424; 455/67.11; 455/67.12; 455/115.1; 455/226.1

(58) Field of Classification Search
USPC ........ 455/423, 424, 425, 67.11, 67.12, 115.1, 455/226.1; 324/158.1, 753, 752
See application file for complete search history.

(56) References Cited

U.S. PATENT DOCUMENTS

| | | | | |
|---|---|---|---|---|
| 6,304,830 | B1 | 10/2001 | Lee | |
| 6,400,965 | B1 | 6/2002 | Phillips et al. | |
| 6,563,301 | B2 * | 5/2003 | Gventer | 324/750.27 |
| 6,657,214 | B1 | 12/2003 | Foegelle et al. | |
| 6,898,426 | B2 | 5/2005 | Matsuoka | |
| 6,983,067 | B2 | 1/2006 | Cox | |
| 2003/0142861 | A1 * | 7/2003 | Penkethman | 382/151 |
| 2005/0149293 | A1 | 7/2005 | Chang et al. | |
| 2006/0241884 | A1 * | 10/2006 | Sathe et al. | 702/108 |
| 2006/0293044 | A1 * | 12/2006 | Sommerfeld et al. | 455/423 |
| 2007/0004397 | A1 * | 1/2007 | Le et al. | 455/423 |
| 2007/0205751 | A1 | 9/2007 | Suzuki et al. | |

FOREIGN PATENT DOCUMENTS

| | | |
|---|---|---|
| DE | 19545239 | 5/1996 |
| JP | 2004072190 | 3/2004 |
| JP | 2007295139 | 11/2007 |

* cited by examiner

*Primary Examiner* — Khalid Shaheed
(74) *Attorney, Agent, or Firm* — Hoffmann & Baron, LLP

(57) ABSTRACT

Systems and methods of providing intelligent handset testing are disclosed. The system performs tests on handsets using customized scripts to analyze the handset on a variety of performance metrics while the handset is optionally running on an active telecommunications network. The system allows a user to "teach" a device to the system by interacting with virtual keys on an image of the hand held device and thus calculates the actual position on the hand held device by way of mathematical algorithms, taking into account any camera distortion at different heights and angles. Thus, the user can manipulate the subject test handset via the testing "fingers" using commands entered through the standalone unit to actuate, for example, any push buttons, slide buttons, recessed sensors, or screen touches. Additionally, the user can compare recorded images and sounds against expected images and sounds to validate tests.

15 Claims, 7 Drawing Sheets

SYSTEMS AND METHODS OF PROVIDING INTELLIGENT HANDSET TESTING

The disclosure generally relates to testing systems, and in particular to systems and methods of providing intelligent handset testing.

BACKGROUND

Electronic devices such as handsets, mobile phones, cellular phones, personal digital assistants (PDAs), and other hand held electronics devices (sometimes collectively referred to herein as "handsets") require testing and other compliance and quality checks by the manufacturers, regulatory boards, service providers, and others before being released as a final product or product line. There is a need for systems and methods for providing intelligent handset testing.

SUMMARY

Embodiments of the present disclosure generally provide systems and methods for providing intelligent handset testing.

In one embodiment, the present disclosure could provide a testing apparatus. The testing apparatus could include an adapter to retain a handset. The testing apparatus could also include an image processing device disposed proximate to the handset and a robotic actuation system disposed proximate to the handset. The testing apparatus could further include a processing system to create a handset profile by correlating images of the handset from the image processing device and controlling the movement of the robotic actuation system.

In one embodiment, the present disclosure could provide a method of testing handsets. The method could include configuring an adapter to retain a handset. The method could also include learning physical and functional properties of the handset by correlating images of the handset and controlling the movement of a robotic actuation system relative to elements of the handset to create a handset profile. The method could further include using an open scripting architecture to create a test script for the handset.

In one embodiment, the present disclosure could also provide an intelligent handset testing system. The system could include a universal adapter to retain a handset. The system could also include a processing system to learn physical and functional properties of the handset and to create a handset profile by correlating images of the handset and controlling the movement of a robotic actuation system relative to elements of the handset. The system could further include a graphical user interface (GUI) to aid in customizing properties of a modified image of the elements of the handset on a terminal.

Other technical features may be readily apparent to skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1A:
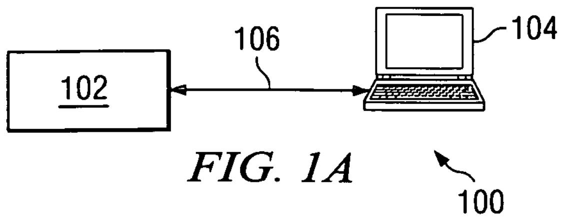
FIG. 1A is a somewhat simplified block diagram of an exemplary system and method of providing intelligent handset testing according to one embodiment of the present disclosure.

FIG. 1A is a somewhat simplified block diagram of an exemplary system and method 100 of providing intelligent handset testing according to one embodiment of the present disclosure. System 100 is generally not drawn to scale and is provided for illustration only. It should be understood that any other suitable system could also be used as or in lieu of system 100 or parts of system 100.

System 100 provides intelligent, automated testing software to test hand-held electronic devices such as, for example, handsets, mobile phones, cellular phones, personal digital assistants (PDAs), MP3 players, hand-held computer terminals, other electronic devices, or any other suitable combination of devices thereof (sometimes collectively referred to herein as "handsets").

System 100 could include an intelligent handset tester (IHT) 102 and a control personal computer (PC) or user or test terminal 104. IHT 102 could be any suitable apparatus for testing handsets including the embodiment shown in and described herein in conjunction with FIG. 2. Terminal 104 could be any suitable stand-alone or network-capable terminal, monitor, computer, device, PDA, hand-held device, Internet-accessible device, other suitable access terminals or devices, or any other suitable combinations thereof. Terminal 104 could be communicably connected to or include a processor, computer, memory, or other data processing or storage circuits or modules.

Although IHT 102 and terminal 104 are illustrated in FIG. 1A to be communicably connected by a suitable hard-wired connection 106, other connections such as, for example, a USB connection, a wireless connection, a network connection, Intranet, Internet, any other suitable connection, or combination of connections therein could also be used to connect IHT 102, individual parts of IHT 102, or a suitable portion of IHT 102 to terminal 104.

System 100 preferably interacts with a handset (not shown in FIG. 1A) in a manner similar to how a human user would interact with a handset as described in detail later herein. By analyzing, actuating, and completing other actions related to a handset or its functionality, system 100 "learns" to work with the same sort of handset, a family of handsets, or other similar handsets. Thus, a test script written and used for one phone by system 100, may be used on other similar phones to verify certain characteristics. For example, the test scripts could verify that messages appear correctly on the handset screen, menu items on the handset are working correctly, audio feedback from the device is satisfactory, certain icons are displayed when necessary, battery life messages are accurate, any other suitable information or verification is correct, or any suitable combination thereof. It should be understood that many other characteristics could be tested, monitored, or otherwise analyzed as is suitable for each phone, family of phones, specific test parameters, required phone criteria or parameters, or any suitable combination thereof.

Figure 1B:
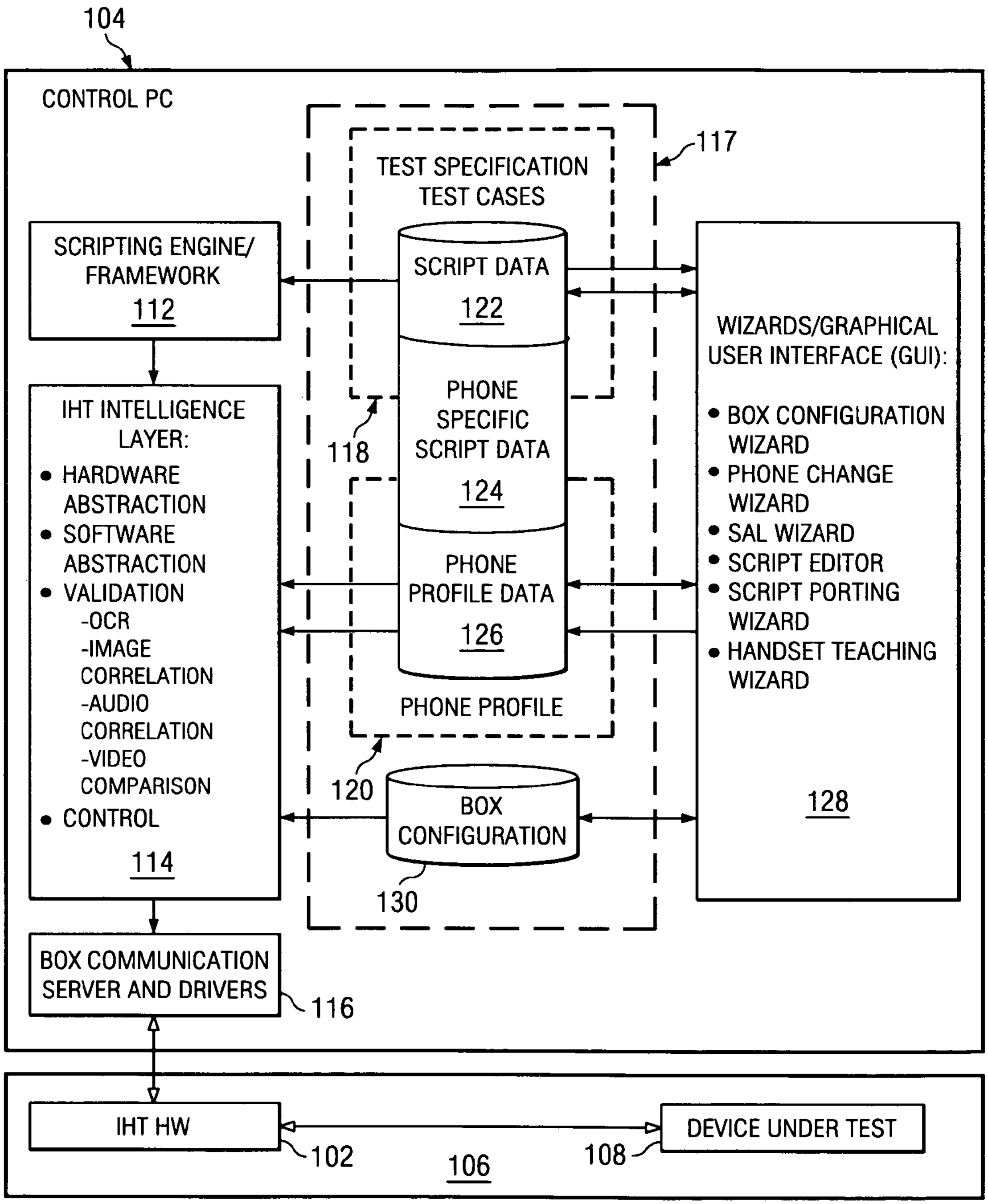
FIG. 1B is a somewhat simplified block diagram of one embodiment of the system and method shown in FIG. 1A.

FIG. 1B is a somewhat simplified block diagram of one embodiment of system 100 shown in FIG. 1A. As described earlier, system 100 includes IHT 102 and terminal 104. IHT 102 communicates with and is configured to retain subject test handset 108. Again, system 100 is generally not drawn to scale and is provided for illustration only. It should be understood that any other suitable system could also be used as or in lieu of system 100 or parts of system 100.

Terminal 104 sends and receives data to and from IHT 102. IHT 102, in turn, interacts with the subject test handset 108. Terminal 104 is communicably connected to scripting engine or framework 112, IHT intelligence layer 114, wizard/graphical user interface (GUI) 128, and script and phone data 117.

Wizard/GUI 128 and scripting engine or framework 112 are communicably connected to terminal 104. In one embodiment, scripting engine or framework 112 aids in creating, defining, executing, or otherwise managing test scripts for system 100. Wizard/GUI 128 could include a box configuration wizard, a phone change wizard, a SAL wizard, script editor, script porting wizard, other suitable wizards or application, or any combination thereof.

IHT intelligence layer 114 could be communicably connected to scripting engine or framework 112 and box communication server and drivers 116. IHT intelligence layer 114 could include a hardware abstraction layer, software abstraction layer, validation module, and a control module. Validation module could include optical character recognition (OCR) engine, an image correlation module, an audio correlation module, a video comparison module, or any suitable data comparison or recognition module, or any combination thereof.

The user interacts with IHT 102 either through the wizards 128 or the scripting engine or framework 112 through the GUI on terminal 104. Wizards/GUI 128 create or modify script and phone data 117, which can then be used by scripting engine or framework 112 to create, modify, and execute tests on system 100.

There are generally three types of data used by system 100: phone profile data 120, test specification/test case data 118, and box configuration data 130. Phone profile data 120 contains information specific to the subject test handset whether it is physical characteristics of the handset or software feature information.

Test specification/test case data 118 includes information needed for individual test scripts or test cases independent of phone characteristics. For example, the user may want to create one hundred contacts with specific names and phone numbers into the subject test handset. Script data 122 would contain the names and phone numbers to be entered.

In addition, system 100 could also use "hybrids" of script data 122 and phone profile data 126 such as, for example, phone specific script data 124. An example of phone specific script data 124 could be a list of configuration parameters for a particular subject test handset needed to connect the handset to the Internet.

Box configuration data 130 could include all data needed to communicate with different hardware associated with IHT 102. For example, box configuration data 130 could include data to communicate with motorized direction control 210, camera 216, microphones 214, and speakers 216 (shown in FIG. 2). Additionally, box configuration data 130 stores translation information to transform images from camera(s) 216 to physical locations inside IHT 102 and associated motor parameters.

Scripting engine or framework 112 uses IHT intelligence layer 114 in conjunction with the subject test handset and script data 117 to, for example, control IHT 102, perform validation on the subject test handset (e.g., image correlation, audio correlation, video comparison, and optical character recognition (OCR)). Scripting engine or framework 112 includes an open scripting architecture and IHT script development engine. Users or testers interact with scripting engine or framework 112 through the uses of a script editor and script porting wizard associated with wizards/GUI 128.

IHT intelligence layer 114 could translate commands from scripting engine or framework 112 in conjunction with the data 117 to communicate with the IHT 102 through box communication server and drivers 116. In addition, the validation portion of the IHT intelligence layer 114 could take information from IHT 102 such as, for example, images, video and audio, and compares such date against any expected text (using OCR), images, video, or audio from script data 124. These comparison results could then be passed back to scripting engine or framework 112. Furthermore, the results could then be reported and verified by system 100 as test "passes" or "fails."

Box communication server and drivers 116 abstracts all of the software used to communicate and control the individual hardware associated with IHT 102 (e.g., motorized direction control 210, camera 216, microphones 214, speakers 216, lights 218 (shown in FIG. 2)) and translates such information into a single interface accessible by terminal 104. Accordingly, system 100 could eliminate the complexity and uncertainty of identifying the hardware associated with IHT 102 irrespective of the specific hardware brands or type of hardware actually used. Terminal 104 could interact with the hardware accordingly.

Box Communication Server and Drivers module 116 could serve as an information exchange module and provide information to terminal 104 on the various hardware drivers and software applications to aid in controlling IHT 102 and parts of IHT 102. For example, the drivers to control, use, or access robotic finger 208 (described in detail later herein) could be stored or otherwise accessed using Box Communication Server and Drivers module 116.

Test specification module 118 and phone profile module 120 generally houses script data 122, phone specific script data 124, and phone profile data 126.

Terminal 104 also includes or is communicably connected to wizards/GUI 128 and box configuration module 130. Wizards/GUI 128 could include a number of different user-accessible "wizards" to aid in configuring IHT 102 including, for example, subject test handset 108, software abstraction layer, test script creation/editing, test script porting wizards, handset teaching wizard, other suitable configuration wizards, or any combination thereof.

System 100 also includes a validation module in IHT intelligence layer 114. The validation module includes verifying any correlations, comparison, or data secured by OCR or any other data inputs. Accordingly, system 100 performs tests on handsets using customized scripts to analyze the subject test handset for a variety of performance metrics.

Performance metrics could include, for example, user interface capabilities, menu options, battery life, audio feedback, sound integrity, SMS retrieval, icons, utility services, network capabilities, and other conformance criteria. The testing could be conducted when the subject test handset is on an active telecommunications network. For example, if the handset is a CDMA handset, the subject test handset could be tested while it is connected to a live CDMA network.

Figure 2:
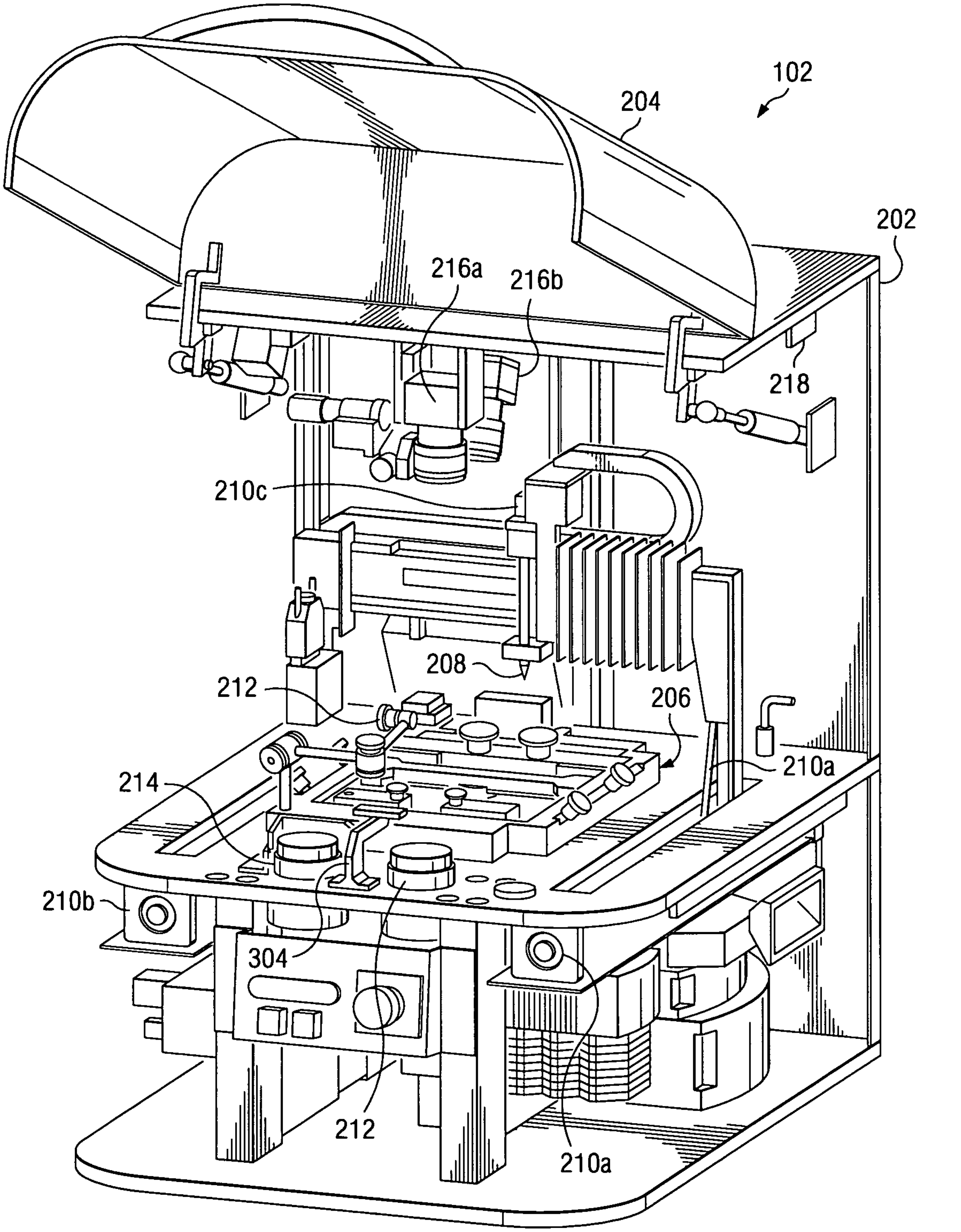
FIG. 2 is one view of an exemplary intelligent handset tester (IHT) according to one embodiment of the present disclosure.

FIG. 2 illustrates an exemplary view of IHT 102 according to one embodiment of the present disclosure. IHT 102 generally provides a customized testing apparatus in which a handset (not shown in FIG. 2) may be disposed, activated, used, accessed, imaged, photographed, sound-recorded, motion-detected, or otherwise manipulated in order to analyze performance or mechanical characteristics. IHT 102 is generally not drawn to scale and is provided for illustration only. It should be understood that any other suitable system could also be used as or in lieu of IHT 102 or parts of IHT 102.

IHT 102 includes an enclosure 202 and access cover 204 as shown in FIG. 2. Enclosure 202 generally provides support or structure for the internal components of IHT 102. Enclosure 202 could be a non-RF shielded structure that allows a subject test handset in IHT 102 to gain access to or remain connected to a live, wireless connection. In other words, even if access cover 204 were in a fully closed position, a test handset situated in IHT 102 would be able to access a live network or RF connection beyond the IHT 102. Thus, the subject test handset could be tested while in an "in-network" mode. In addition, the subject test handset could be tested while connected to different service providers. Alternatively, enclosure 202 could be an RF-shielded structure when the test does not require that the subject test handset operate in a live or "in-network" mode, or connected to an emulated network connection in conjunction with a network emulator.

Access cover 204 could be hingably attached or otherwise attached to enclosure 202 as generally shown in FIG. 2. It should be understood that any other suitable access structure could be used as access cover 204 including, for example, a movable panel or door, sliding window, sliding panel or door, swinging panel or door, roll-up panel door, remote-controlled door, any other suitable access structure, or any suitable combination thereof. Access cover 204 could be moved from a closed position to an open position and provide access to different components such as, for example, one or more adapters 206, robotic fingers 208 and motorized direction controls 210*a* (for x-axis motion), 210*b* (for y-axis motion), and 210*c* (for z-axis motion) (collectively referred to herein as motorized direction control 210).

Adapter 206 retains or otherwise disposes a subject test handset (not shown in FIG. 2) in a desirable position. Adapter 206 is preferably configured to hold a hand held device 202 and is adjustable to accommodate various configurations, sizes, and types of hand held devices as generally shown in FIG. 2. Adapter 206 is generally configured to remain in a stationary position. However, adapter 206 could be configured to move in the X, Y, and Z-axes to manipulate the positioning and disposition of the subject test handset and then retain that position for the current test and any other future tests as desired. Additionally, adapter 206 could control the relative position or configuration of the subject test handset. For example, adapter 206 could control the flip, slide, or angle of the subject test handset. In one embodiment, the angle of the subject test handset could be changed to test features related to any automatic rotation sensors that could be used to flip image orientation on the subject test handset from portrait to landscape.

Although only one adapter 206 is shown in FIG. 2, it should be understood that any suitable number of adapters 206 could be used. Adapter 206 is described in more detail later herein in conjunction with the description accompanying FIGS. 3A and 3B.

Robotic finger 208 generally manipulates keys, switches, or touch screens of the subject test handset. The position of robotic finger 208 could be directed and controlled by IHT 102. Robotic finger 208 could also be controlled to actuate or otherwise manipulate a key, switch, push button, recessed sensor, touch screen, actuation point, or other suitable feature on the subject test handset with a particular touch, force, pressure, motion, rotation, push, pull, sliding motion, repetitive action, sensitivity, temperature, capacitance touch, interaction or tap point, other suitable characteristic, or combination thereof.

Robotic finger 208 could be customized or replaced for each subject test handset, as desired or as required by particular tests or testing criteria. It should be understood that robotic finger 208 could include any shape, size, structure, or material as is required by a particular subject test handset or testing criteria. Robotic finger 208 could be part of or communicably connected to motorized direction control 210.

Motorized direction control 210 could include any suitable step-motor or series of step-motors with precision and positional control. Motorized direction control 210 could control the X, Y, and Z positions of robotic finger 208. Optionally, motorized direction control 210 could also control the X, Y, and Z positions of adapter 206 and, thus, the relative position of the subject test handset.

Besides manipulating and retaining some sort of position control, IHT 102 could include a number of devices to accomplish and carry out different tests on the subject test handset including, for example, with the use of one or more microphones 212, speakers 214, cameras 216, and lights 218 as shown in FIG. 2. It should be understood that IHT 102 could also include other testing devices such as, for example, ambient temperature changing systems, ambient humidity changing systems, noise canceling systems, noise interference systems, RF interfering systems, noise filters, lighting filters, black lighting systems, misting systems, Bluetooth adapters, infrared adapters, hands-free headsets and conference systems, other suitable testing systems, or combinations thereof.

One or more microphones 212 sense any sound originating from the subject test handset either at any time or at times specified by a particular test script. It should be understood that any suitable microphone or microphone-like device could be used as microphones 212 or part of microphones 212. IHT 102 could also include additional shielding to shield microphones 212 from any noise from the subject test hand set or an associated antenna.

Similarly, one or more speakers 214 emanate sounds either from the user or a computer generated test script or from the subject test handset as any time or at times specified by a particular test script. It should be understood that any suitable speaker or speaker-like device could be used as speakers 214 or part of speakers 214.

One or more cameras 216$a$ and 216$b$ (collectively referred to herein as camera 216) could be used to take live pictures or screen shots of the subject test handset or to record live feed or series of screen shots of the subject test handset at any time or at times specified by a particular test script. It should be understood that any suitable camera, still camera, moving picture camera, or camera-like device could be used as camera 216 or part of cameras 216.

Similarly, one or more lights 218 could be included as part of IHT 102 to provide certain ambient lighting or lighting related effects at any time or at times specified by a particular test script. It should be understood that any suitable light or light-like device could be used as lights 218 or part of lights 218.

Removable Universal Adapter

Figure 3A:
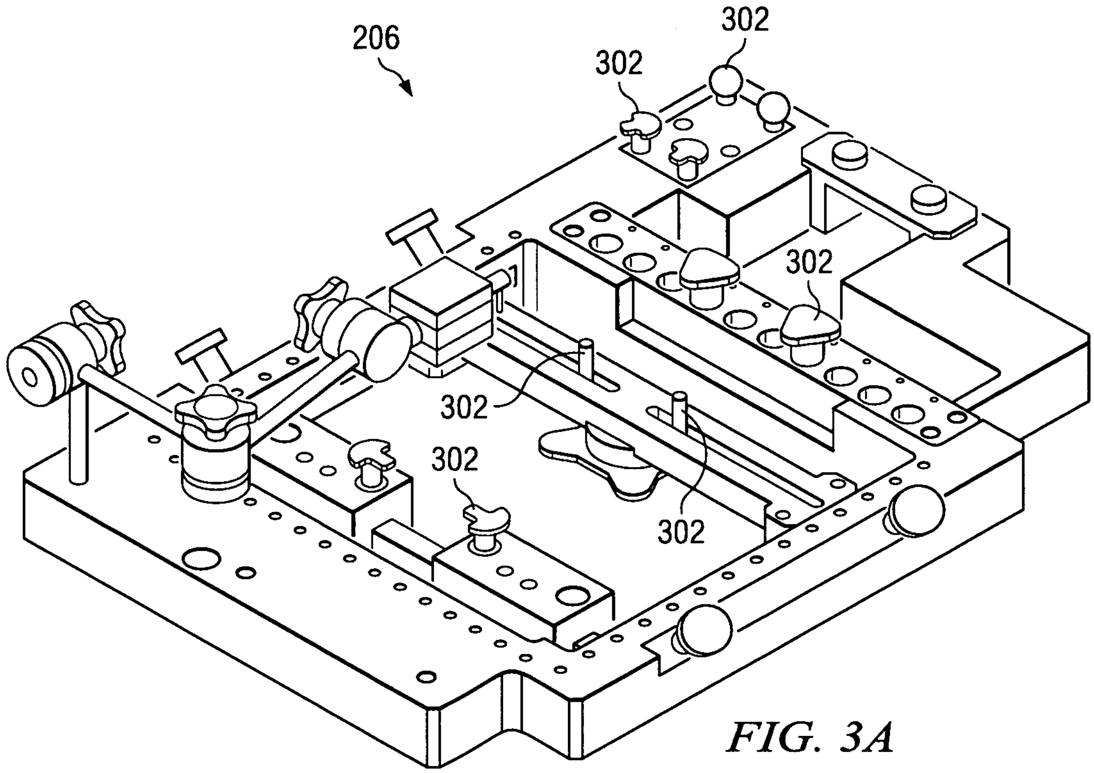
FIG. 3A is a top view of an exemplary handset adapter for an IHT according to one embodiment of the present disclosure.
Figure 3B:
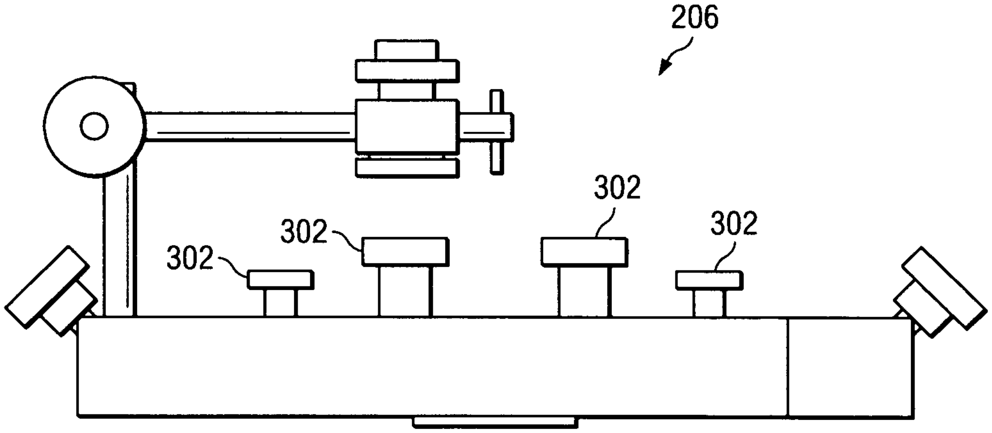
FIG. 3B is an exemplary side view of the handset adapter shown in FIG. 3A.

FIGS. 3A and 3B are illustrations of an exemplary handset adapter 206 for IHT 102 according to one embodiment of the present disclosure. Adapter 206 is generally not drawn to scale and is provided for illustration only. It should be understood that any other suitable system could also be used as or in lieu of adapter 206 or parts of adapter 206. It should be understood that IHT 102 could use more than one adapter 206 for ease of use and transition between different test configurations and subject test handset.

Adapter 206 or parts of adapter 206 could be removed to accommodate and customize the overall containment and disposition of the subject test handset as desired. In addition, adapter 206 could be configured to hold or otherwise retain different configurations of the subject test handset, such as those having a slide, flip, fold, bar, block, wide, tall, other suitable configurations, or combinations thereof. For example, adapter 206 could include removable and movable supports 302 such as, for example, slides, grips, ratchet compressors, other suitable brackets and supports, or any combination thereof to aid in retaining virtually any sized or configuration of a subject test handset.

Supports 302 move to hold or otherwise retain subject test handsets of all different models and configurations. Supports 302 could use any suitable system to remove and retain positions of supports 302. In FIG. 3A, for example, supports 302 use a "peg and hole" type system or similar system to move and customize adapter 302. Thus, supports 302 could be moved easily with minimal effort and yet provide adequate support to hold or otherwise retain the subject test handset. In one embodiment, supports 302 could include different angles and angled side supports to provide customized retaining grips and holds for use with different shaped and sized subject test handsets.

Adapter 206 is preferably disposed within enclosure 202 of IHT 102 using a retaining system such as a quick release locking mechanism 304 (shown in FIG. 2) having, for example, a suitable base plate supports working in conjunction with each other. Preferably, adapter 206 may be adjusted, removed, installed without the use of tools, or locked in place with a simple locking mechanism.

Figure 3C:
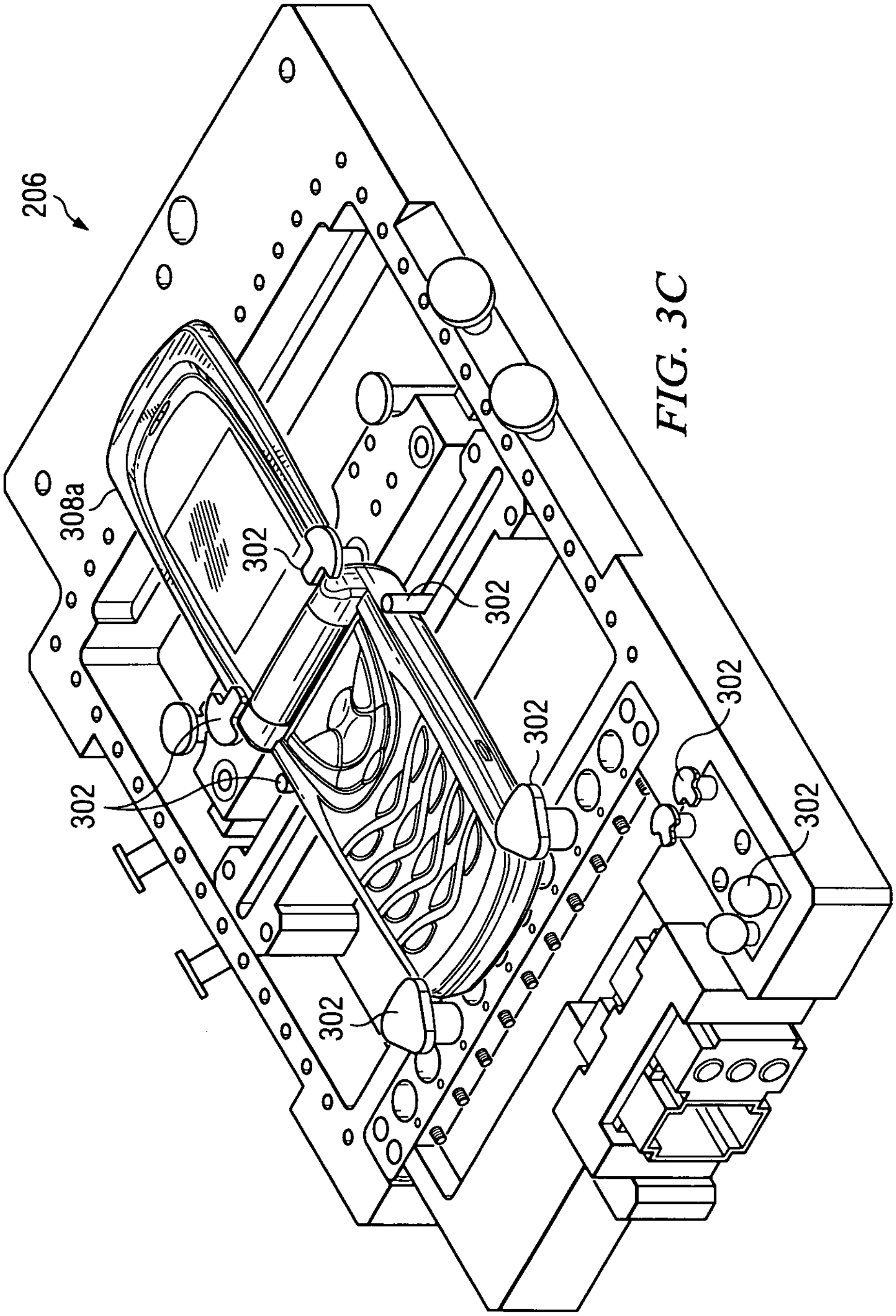
FIGS. 3C and 3D are illustrations of an exemplary handset adapter with respective subject test handsets in place according to one embodiment of the present disclosure.
Figure 3D:
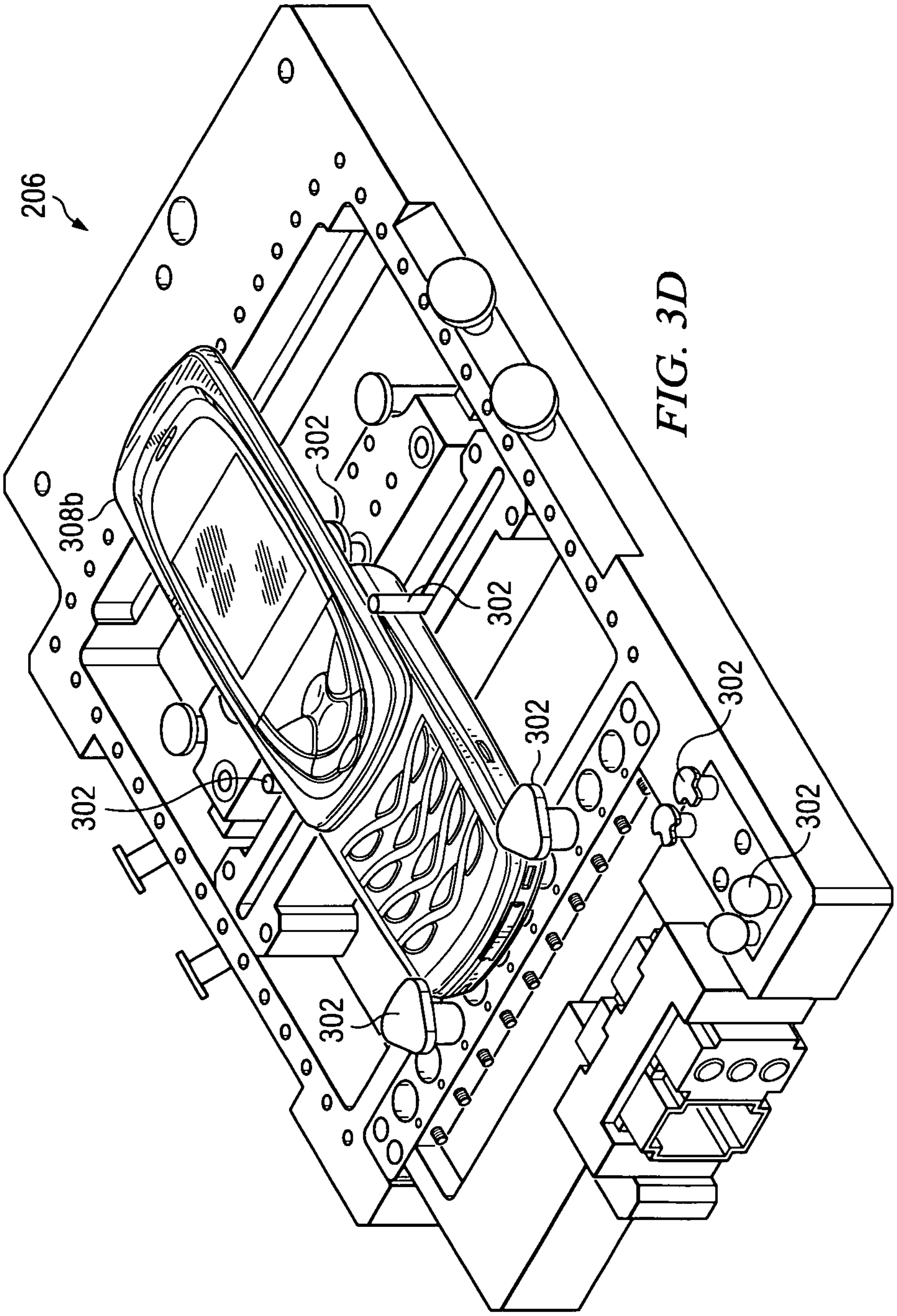

FIGS. 3C and 3D are illustrations of exemplary handset adapters 206 with subject test handsets 308$a$ and 308$b$, respectively, in place according to one embodiment of the present disclosure. Adapter 206 and subject test handsets 308$a$ and 308$b$ are generally not drawn to scale and are provided for illustration only. Subject test handsets 308$a$ and 308$b$ are sometimes collectively referred to herein as subject test handsets 308 or simply subject test handset(s).

Handset Teaching Wizard

System 100 learns each subject test handset or family of handsets to efficiently test subject test handsets. As an example, in order to interact with the subject test handset, system 100 could ascertain the physical characteristics of the subject test handset such as, for example, thickness, key locations, key depth, display location, display size, key type, switch position, other suitable physical attributes, or combinations thereof using an intuitive handset teaching wizard included in system 100.

Figure 4:
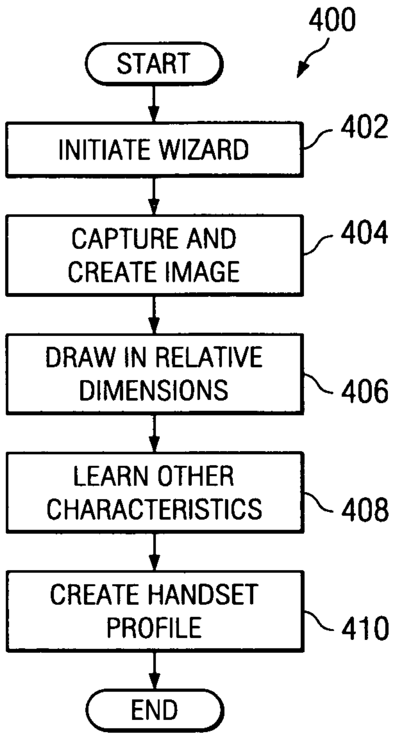
FIG. 4 is a somewhat simplified flow diagram illustrating an exemplary system and method of providing intuitive handset learning according to one embodiment of the present disclosure.

FIG. 4 illustrates method 400 to provide intuitive handset learning according to one embodiment of the present disclosure. It should be understood, however, that other methods could also be used as or in lieu of method 400 or parts of method 400. Method 400 could be used in systems such as, for example, system 100 to create handset profiles that could be stored, retrieved, appended, or edited as desired. It should also be understood that the steps shown in method 400 could be performed sequentially, or at different times as is desired.

Method 400 generally includes using an intuitive teaching wizard in which the user or tester is prompted to answer multiple choice questions and/or interact with a "point-and-click" interface to learn a subject test handset. System 100 automatically transforms these user interactions into physical locations of the subject test handset parts (e.g., the screen, keys, push buttons, etc.) and saves the correlated information in handset profiles.

In addition, the user could include illustrating or accommodating for certain physical characteristics such as the dimensions of the subject test handset of features of the subject test handset (e.g., the relative height, width, and depth of the screen). The handset profiles could be stored in memory for later use. Thus, the amount of time and time and effort required to "learn" a subject test hands is minimized and thus efficiently carried out. Method 400$a$ provides an interface for learning the physical attributes of the subject test handset including, for example, the keypad layout, overall dimensions, locations of switches, buttons, or other actuated parts of the subject test handset to create a modified image of the subject test handset.

In step 402, a handset is placed in IHT 102 and the user initiates the teaching wizard and follows instructions provided by the wizards/GUI 128. For example, the user could use the instructions displayed on terminal 104 to initiate the teaching wizard.

In step 404, the user interface captures an image of the subject test handset and creates an image of the handsets' keypad. For example, wizard/GUI 128 could take an image of the subject test handset using at least one of cameras 216$a$ or 216$b$ and display an image of the handset's keypad on terminal 104.

In step 406, method 400 includes providing the user or tester with an interface to draw in relative positions of elements of the subject test handset to create a modified image of the keypad layout and other user manipulatable areas of the subject test handset. In one embodiment, the user could drag and drop key images onto the image using wizard/GUI 128. The user could also draw rectangles around areas where the keys, buttons, or switches are located in one embodiment. The user could also draw in the relative dimensions of each feature such as the shape, size, height, width, depth, or other physical characteristic of a screen, button or other feature of the subject test handset.

Accordingly, the handset teaching wizard could display images of the subject test handset from camera 216 and prompts the user to point and click on the images using terminal 104. A modified image of the physical keypad and other user accessible areas of the subject test handset is created and other relational information is correlated, stored, and accessed when required.

In step 408, method 400 learns other characteristics associated with the subject test handset using various components of IHT 102 such as for example, adapter 206, robotic finger 208, motorized direction control 210, microphone 212, speaker 214, camera 216, and lights 218. Using these components, method 400 correlates various information into metric associated with the handset's user interface capabilities, menu options, battery life, audio feedback, sound integrity, SMS retrieval, icons, utility services, network capabilities, operation modes, and other criteria.

Based on the selections of the user, IHT 102 creates a handset profile in step 410 describing the physical characteristics of the subject test handset. System 100 can direct IHT 102 to translate the handset profile into physical locations on the subject test handset and calibration information for the handset screen for use in IHT 102. Each handset profile could be appended, recorded, stored, or otherwise memorized (i.e., "learned") and saved as a handset profile.

Accordingly, method 400 provides a system and method of communicating between IHT 102 and terminal 104 to create handset profiles associated with physical and performance characteristics of the subject test handset. The handset profiles could be used to, for example, perform other diagnostics and tests and ultimately to "learn" other handsets of families of tests.

Key Definitions for Subject Test Handset

Key definition is part of the overall "teaching wizard" of system 100. When performing actions on a subject test handset the same key could have multiple uses. Accordingly, it is often necessary to actuate or press the same key for different durations or using a particular actuation pattern depending on the key use desired. It is thus important that the user or tester have access to all or most key modes in all or most contexts when using a user interface (e.g., wizard/GUI 128) so that the user can quickly and easily create automated tests in a relatively simple and intuitive manner.

Figure 5:
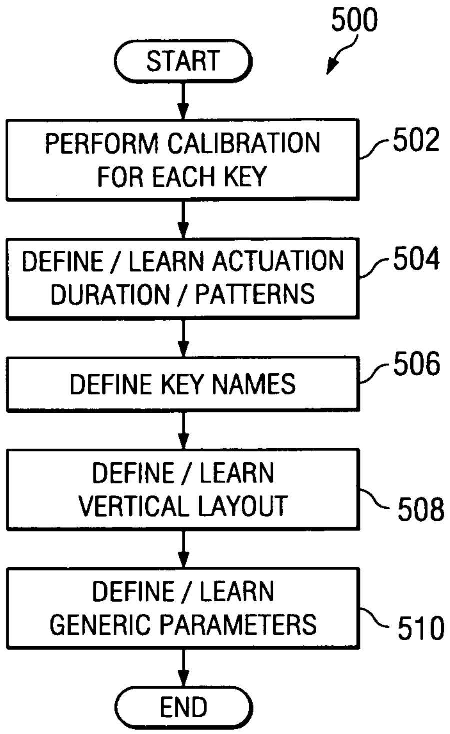
FIG. 5 is a somewhat simplified flow diagram illustrating an exemplary system and method of defining keys on a subject test handset according to one embodiment of the present disclosure.

FIG. 5 is a somewhat simplified flow diagram illustrating an exemplary system and method 500 of defining keys on the subject test handset according to one embodiment of the present disclosure. It should be understood, however, that other methods could also be used as or in lieu of method 500 or parts of method 500. It should also be understood that the steps shown in method 500 could be performed sequentially, or at different times as is desired.

Method 500 learns and defines individual keys and correlates information about how the keys work. In one embodiment, method 500 could be a wizard-driven interface, such as wizard/GUI 128, to create key definitions. Method 500 could have the ability to re-use the key definitions from one subject test handset to another subject test handset and from one test to another test.

In step 502, method 500 performs a calibration routine for each physical key on the subject test handset. For example, each physical key could be named (e.g., according to its function), the physical coordinates could be defined using a visual tool, and each could be tested as they are defined. Other suitable physical, calibration or profile type information could also be correlated in step 502.

In step 504, method 500 continues and defines appropriate durations or actuation patterns for each key as it relates to a particular function of the key. As an example, the force required to press a key and the length required for the key to be actuated could be ascertained and recorded in step 504. In step 506, method 500 gives the user an opportunity to define and name the keys as desired. For example, a particular key used to activate a call could be named "Call."

In step 508, method 500 defines the "vertical layout" of the subject test handset. For example, method 500 could include learning the "high spots" of the subject test handset. With this information, system 100 and specifically, robotic finger 208, could be allowed to hover as low as possible over the subject test handset.

In step 510, method 500 learns generic parameters common to all keys of the subject test handset. Examples of generic parameters could include, duration of the standard short (default) key press, duration of the standard long key press, the pause between two key strokes, user defined key values in different modes (numeric, alphabet, symbol, etc.), or other suitable parameters.

As another example, step 510 could include learning the pause between keystrokes in text mode when switching between different letters, or other suitable parameters. This last example could occur when if, for example, the user of a particular subject test handset types 'Hello' on a 12-key keypad, then the user should type: 44-33-55-pause until cursor appears-5-pause until cursor appears-55-666.

Accordingly, method 500 generally learns and defines individual keys and correlates information about how the keys work and stores that information into the handset profile.

Portable Handset Profiles

In order for system 100 to perform automated and reusable test, to run identical tests or to create new tests built on older tests, portable handset profiles are useful. Conventionally, users and testers typically re-create tests each time they need to run them, and thus the testing process becomes inefficient, superfluous, and time consuming.

Figure 6:
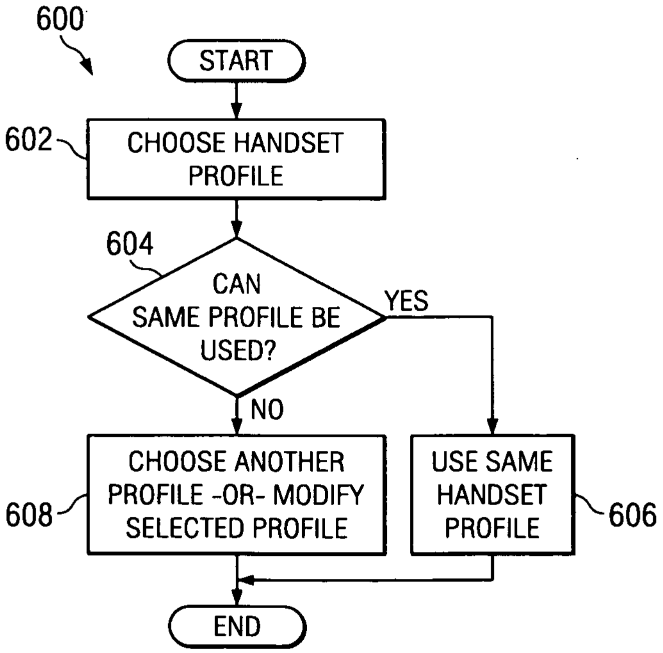
FIG. 6 is a somewhat simplified flow diagram illustrating an exemplary system and method of providing portable handset profiles according to one embodiment of the present disclosure.

FIG. 6 is a somewhat simplified flow diagram illustrating an exemplary system and method 600 of providing a user or tester with quickly accessible existing handset definitions to modify subject test handset definitions for use with new or similar subject test handsets according to one embodiment of the present disclosure. It should be understood, however, that other methods could also be used as or in lieu of method 600 or parts of method 600. It should also be understood that the steps shown in method 600 could be performed sequentially, or at different times as is desired.

In step 602, method 600 chooses a handset profile created by for example, method 500 described above. The handset profiles could be stored as text files, spreadsheets, database entries, any other suitable format, or any combination thereof. The handset profiles could be saved in any suitable format and accessible using terminal 104 or any other suitable computer or data processor. In step 604, method 600 ascertains whether the same handset profile could be used in the present subject test handset. If yes, method 600 continues in step 606. Otherwise, another handset profile is chosen or is modified by method 600 in step 608.

Accordingly, method 600 could create new or modify, copy, append, or use stored handset profiles as a template for other subject test handset profiles by, for example, following method 500. After the initial process is complete, the user or test does not have to relearn or start a profile from scratch. In addition, method 600 allows other users or testers in different locations to send scripts electronically or otherwise to each other and efficiently share profiles and thus possibly divide up the testing process using more than one IHT 102 simultaneously.

The user ports a handset profile simply by going through the "teaching wizard." The user opens an existing profile for a different subject test handset, chooses a new name for that profile, and follows the wizard prompts for the subject test handset. The user only needs to interact with the wizard to make changes where appropriate. If the selected profile is correct, no change is necessary. The new profile could then be ported, used as a template, or otherwise act in conjunction with or as any other handset profile on the system.

In the course of using system 100, users could create multiple test scripts for different handsets. In order to get a test script to work on a different handset from the one it was written for, the user may be required to port the original script to the new handset. As an example, suppose a user creates the following test for a particular handset manufactured by manufacturer #1:

1. Dial: 18004664411;
2. Verify that the number has been dialed correctly;
3. Call the number;
4. Verify that the call connects;
5. Verify the audio plays properly from the handset earpiece;
6. End the call; and
7. Verify that the screen displays the proper "End Call" message.

Suppose further that the user wants to run that same test script on a second handset manufactured by manufacturer #2. The user could port the test script to the second handset by placing the second handset in IHT 102 and step through a "phone change" wizard offered by GUI. The phone change wizard could learn the second handset using IHT 102 and then use the porting wizard, also offered by GUI to port the script and test the second handset.

The porting wizard could step through the original test script and create a new script with additional steps exclusively for the second handset. If the steps remain the same, the steps in the test scripts are copied exactly. If the steps are to change, the user could be asked to modify and update the desired new step or steps. In addition, since dialing, calling, and ending the call (steps 1, 3, and 6 in the example above) are the same for the second handset, the porting wizard will simply copy these steps exactly to the new script.

If the verification steps (steps 2, 4, 5, and 7 above), are all different (e.g., the second handset displays messages in a different format and font or the second handset's earpiece plays audio differently), then porting wizard could ask the user to perform a different verification than that performed for the first handset. For example, the porting wizard could ask the user to record a new image for steps 2, 4 and 7 and to re-record the audio for step 5 above. In order to make this easier for the user, the porting wizard will perform each step on the second handset as it goes through each step. Thus, the porting wizard aids in creating a customized test script for the second handset.

Open Scripting Architecture

In addition to performing repeatable tasks on a handset, users often want the flexibility to perform other tasks or interact with other products. System 100 has an open scripting architecture. System 100 could thus interact with software written in most software development programs or platforms such as, for example, Microsoft Visual Studio environments. Thus, system 100 could be continuously customized and made more robust with ease. Additionally, the user or tester could create plug-ins to extend functionality of IHT 102 and system 100 as a whole. For example, IHT 102 could be configured for compatibility with other system such as, for example, AT commands, Bluetooth functionality, PC Audio features, other suitable systems, or combinations thereof.

Figure 7:
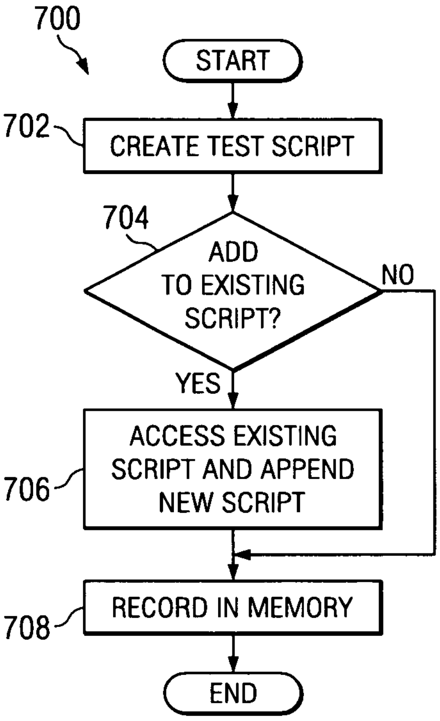
FIG. 7 is a somewhat simplified flow diagram illustrating an exemplary system and method of creating, compiling, using, modifying, and appending test scripts using an open scripting architecture according to one embodiment of the present disclosure.

FIG. 7 is a somewhat simplified flow diagram illustrating an exemplary system and method 700 of creating, compiling, using, modifying, recording, editing, and appending test scripts using an open scripting architecture available through an IHT script editor found, for example, in wizards/graphical user interface (GUI) 128 or using any suitable editing tool according to one embodiment of the present disclosure. It should be understood, however, that other methods could also be used as or in lieu of method 700 or parts of method 700. For example, an open scripting engine could compile software code from any common software development environment such as, for example, Microsoft Visual Studio. It should also be understood that the steps shown in method 700 could be performed sequentially, or at different times as is desired.

In step 702, the user could, for example, write scripts directly into the scripting language to create new code or calls external scripts from within the scripting engine to create a test script. The user can then run the scripts either from an IHT scripting interface such as, for example, scripting engine or framework 112, or through a common development environment such as, for example, Microsoft Visual Studio.

In step 704, the user could choose whether to add the new test script created in step 702 to an existing script. If desired, then the user could access an existing script and append the new script to the existing script in step 706 and then store it in step 708. Otherwise, in step 708, the new test script created in step 702 could be recorded or otherwise stored in memory.

The user could add reference scripts created using the scripting engine or framework 112 or any other common development environment. Thus, in one embodiment, the user can use other developers' scripts to control non-IHT portions of the test environment from within IHT scripts.

Accordingly, method 700 generally provides an efficient and relatively easy method of creating, compiling, using, modifying, and appending test scripts using the advantages of an open scripting architecture. Additionally, the scripting engine or framework 112 could identify or otherwise recognize syntax errors during compilation and prompt the user to fix such errors before allowing the scripts to be saved, run, or otherwise used.

Software Abstraction Layer

The software abstraction layer (SAL) shown in FIG. 1B generally provides universal access to subject test handset software functionality. SAL generally hides details of subject test handset software differences and allows the user to write test plans against a generic subject test handset. SAL leads the user through a very intuitive wizard that "teaches" IHT 102 how to interact with the various functional areas of the subject test handset.

Once system 100 "learns" the SAL for a particular subject test handset, the user or tester can create scripts and run existing scripts using the open scripting architecture. SAL could include features such as a calling interface, phone idle mode, contacts/address book, messaging systems (SMS/MMS/etc.), menus, settings, browser, connectivity, other functional features of the subject test handset, or combinations thereof. New features could easily be added to SAL over time because of the open architecture of SAL.

OCR Assisted Menu Learning

With the use of an Optical Character Recognition (OCR) engine, system 100 could "learn" all of the menu items (e.g., the menu option tree of a subject test handset) and use them within the context of script creation. System 100, for example, could interact with the subject test handset and scroll through the menus automatically. The camera will record an image of each screen as it scrolls through the menus and the OCR engine could read each menu item from the image. Thus, system 100 could create a menu tree and save it to the subject test handset's profile. Accordingly, the menu tree could eventually be used to easily create and port test scripts as part of the SAL.

Figure 8:
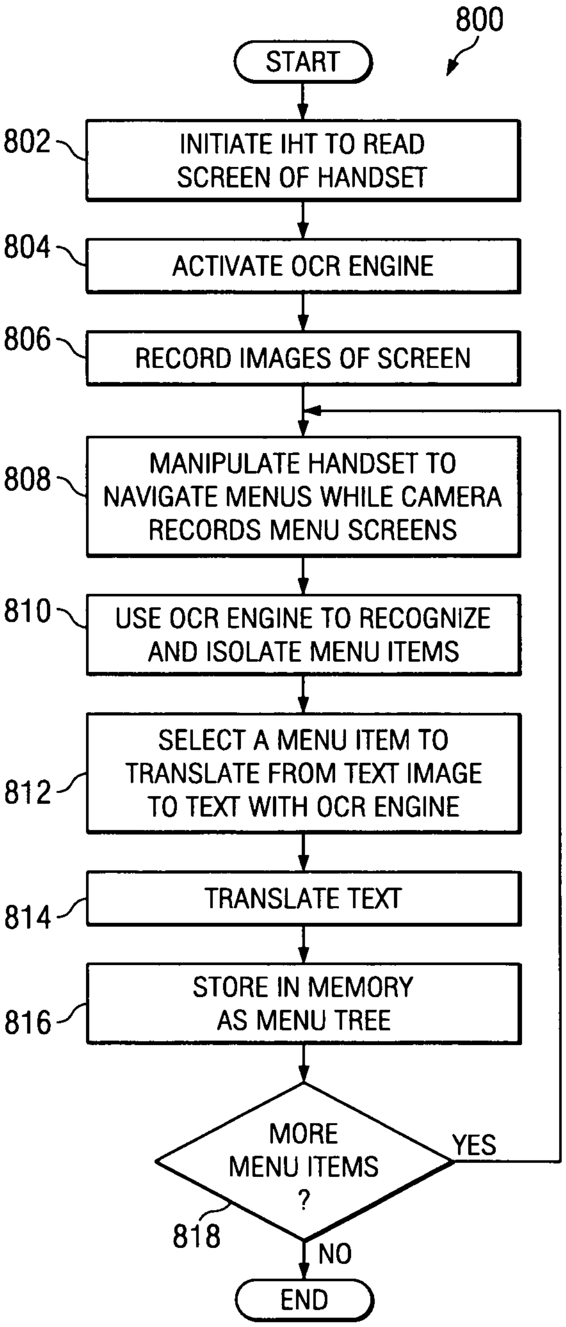
FIG. 8 is a somewhat simplified flow diagram illustrating an exemplary system and method of providing an OCR engine to "learn" a subject test handset to aid in creating test scripts according to one embodiment of the present disclosure.

FIG. 8 is a somewhat simplified flow diagram illustrating an exemplary system and method 800 of providing an OCR engine to "learn" all of the menu items of a subject test handset and use them, for example, in creating test scripts according to one embodiment of the present disclosure. It should be understood, however, that other methods could also be used as or in lieu of method 800 or parts of method 800. It should also be understood that the steps shown in method 800 could be performed sequentially, or at different times as is desired.

Method 800 includes having IHT 102 navigate the menu tree of the subject test handset and "read" the menu names using optical character recognition (OCR). In one embodiment, the menu information is stored in a file as a menu tree and used in both the scripting engine and SAL to run automated tests.

In step 802, the test apparatus (i.e., IHT 102) is initialized and set-up to read the screen of the subject test handset. The OCR application is activated in step 804 and camera 216 could record images from the subject test handset in step 806. Robotic finger 208 could manipulate the subject test handset and navigate the keys using the handset profile definitions, and ultimately navigate the menus of the subject test handset in step 808. An image correlation engine could recognize and isolate individual menu items in step 810.

A particular menu item could be selected in step 812 and translated into text by the OCR engine in step 814. As each translation is complete, each menu item could be stored in a menu tree file in step 816. If the menu tree file cannot be called and used by the scripting engine and SAL, or there are no more menu items to analyze in step 818, the robotic finger accesses another key in step 808.

Once the menu tree is recorded, system 100 and in particular, IHT intelligence layer 114 (shown in FIG. 1B), could ascertain and record the various features available on the subject test handset. In addition, system 100 could also ascertain and record the menu locations of each of those features, the keys required to interact with those features, and the inputs and outputs required by those features. System 100 could then make each menu item available to the user for testing either through the scripting engine or framework 112 or as part of SAL in IHT intelligence layer 114. In one embodiment, method 800 is performed entirely without user input and could thus be run overnight without human intervention. Method 800 could thus save handset testers countless hours teaching the various features and porting scripts from one handset to another.

Accordingly, systems and methods of providing intelligent handset testing are disclosed.

It may be advantageous to set forth definitions of certain words and phrases used in this patent document. The term "couple" and its derivatives refer to any direct or indirect communication between two or more elements, whether or not those elements are in physical contact with one another. The terms. "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A testing apparatus comprising:

an adapter to retain a handset in test;

an image processing device disposed proximate to the handset;

a robotic actuation system disposed proximate to the handset;

a processing system configured to learn each handset or a family of handsets by creating a handset profile comprising physical and functional properties of the handset by correlating images of the handset in test received from the image processing device and controlling the movement of the robotic actuation system for performing desired actions on the handset in test; and a graphical user interface (GUI) associated with the processing system, wherein the GUI aids in customizing properties of a modified image of the handset;

wherein the processing system learns functional properties of a key associated with the handset by learning at least one of: a key function, a required duration of a standard key press, a required duration of a long key press, a required pause between two key strokes, a user defined key value, and different key modes.

2. The testing apparatus of claim 1, wherein the handset profile is used to test a second handset.

3. The testing apparatus of claim 1, wherein the processing system is configurable to learn the handset using at least one of: optical character recognition (OCR), image correlation, audio correlation, and video comparison.

4. The testing apparatus of claim 1, wherein the processing system further uses the robotic actuation system to manipulate the menu options for the handset and to further learn secondary menu options for the handset.

5. The testing apparatus of claim 1, wherein movement of the robotic actuation system is configurable in three-dimensions.

6. The testing apparatus of claim 1, wherein the robotic actuation system is configurable to actuate at least one of: a key, a switch, a push button, a recessed sensor, a touch screen, and an actuation point.

7. The testing apparatus of claim 1, wherein the test apparatus comprises scripting framework having an open scripting architecture to aid in at least one of: creating test scripts, editing test scripts, appending test scripts, and porting test scripts.

8. The testing apparatus of claim 1, wherein the adapter comprises customizable supports to retain the handset.

9. The testing apparatus of claim 1 further comprising:

a sound system proximate to the handset, the sound system having a microphone to record sound from the handset and a speaker to project sound to the handset.

10. The testing apparatus of claim 1, wherein the processing system comprises an intelligence layer having hardware abstraction and software abstraction capabilities.

11. A method of testing handsets, the method comprising:

configuring an adapter to retain a handset in test;

using a processing system to learn physical and functional properties of the handset or a family of handsets by correlating images of the handset in test and controlling the movement of a robotic actuation system relative to elements of the handset to create a handset profile comprising the physical and functional properties of the handset;

using an open scripting architecture to create a test script for the handset; and using a graphical user interface (GUI) to aid in customizing properties of a modified image of the elements of the handset on a terminal;

wherein the processing system learns at least one of: a key function, a required duration of a standard key press, a required duration of a long key press, a required pause between two key strokes, a user defined key value, and different key modes.

12. The method of claim 11 further comprising:

using the handset profile to test a second handset.

13. The method of claim 11 further comprising:

using the processing system to correlate images of the handset to learn menu options of the handset using at least one of: optical character recognition (OCR), image correlation, audio correlation, and video comparison.

14. The method of claim 11, wherein the open scripting architecture aids in at least one of: creating test scripts, editing test scripts, appending test scripts, and porting test scripts.

15. An intelligent handset testing system comprising:

a universal adapter to retain a handset;

a processing system to learn physical and functional properties of the handset and to create a handset profile comprising the physical and functional properties of the handset by correlating images of the handset and controlling the movement of a robotic actuation system relative to elements of the handset; and a graphical user interface (GUI) to aid in customizing properties of a modified image of the elements of the handset on a terminal;

wherein the processing system learns the handset using at least one of: optical character recognition (OCR), image correlation, audio correlation, and video comparison.

* * * * *